Oct. 17, 1961    B. E. CARDER    3,004,723
FEED MILL MACHINE
Filed April 6, 1960
FIG. 1
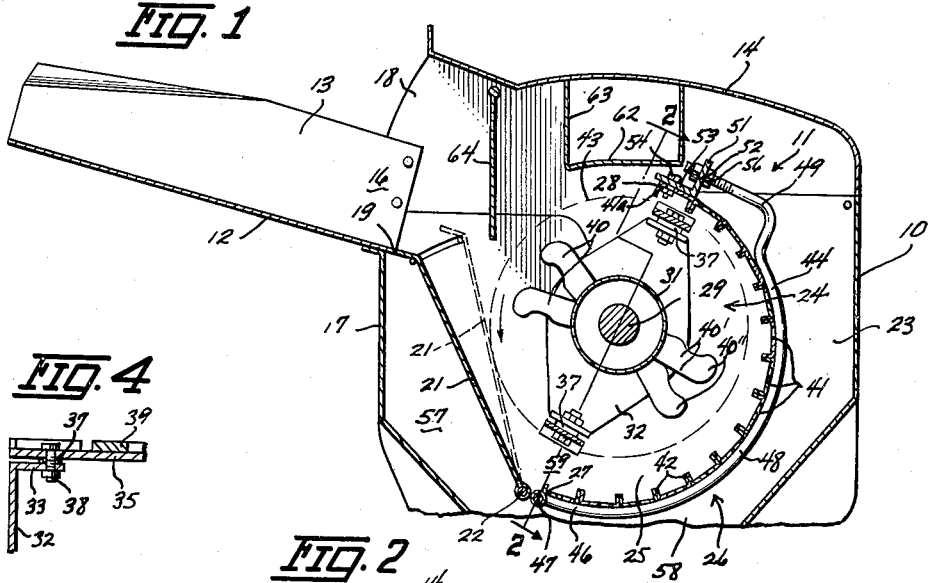
FIG. 4
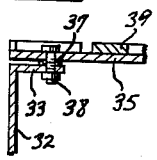
FIG. 2
FIG. 3
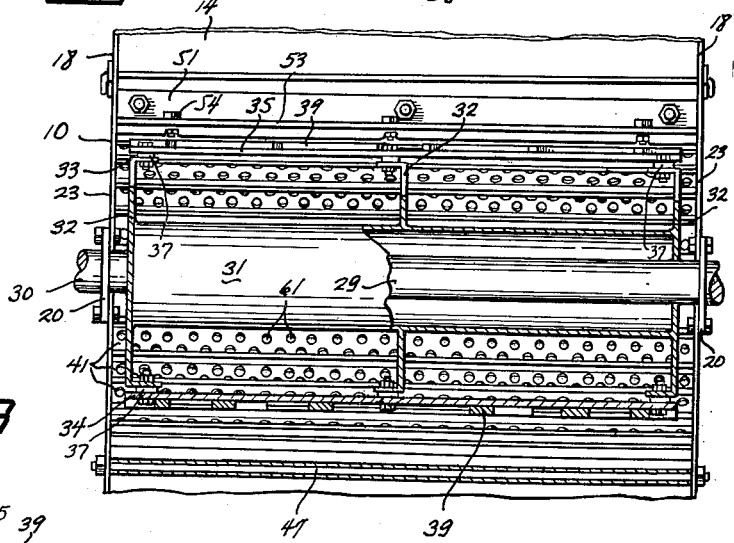
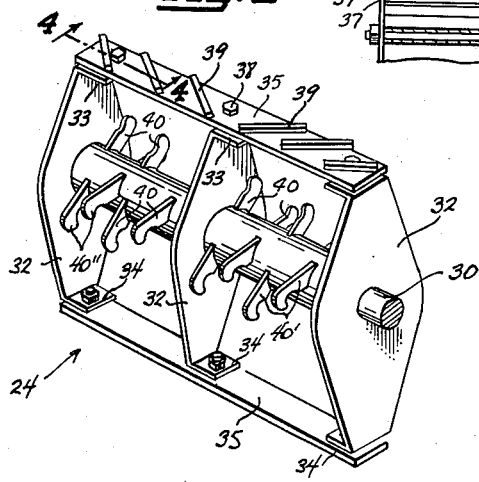
INVENTOR.
BILLY E. CARDER
BY Lowell & Henderson
ATTORNEYS.

United States Patent Office 3,004,723
Patented Oct. 17, 1961

3,004,723
FEED MILL MACHINE
Billy E. Carder, North English, Iowa
Filed Apr. 6, 1960, Ser. No. 20,458
2 Claims. (Cl. 241—189)

This invention relates to a machine of the feed mill type which is designed for grinding grain, such as ear corn, shell corn and the like for animal feed, and is concerned particularly with that portion of the machine utilized for shelling the corn, crumbling the cobs and shredding the husks in one operation.

An object of this invention is to provide an improved machine for processing ear corn for feed purposes.

A further object of this invention is to provide a feed mill machine with rotating means which coact with a perforated grate for processing ear corn, and wherein the grate is pivotally mounted for radial adjustment relative to the rotating means so as to meet conditions of wet or dry corn, to compensate for wear and to assure uniform results under all conditions.

Yet another object of this invention is to provide a feed mill machine having a rotating reel unit for coaction with a semi-circular perforated grate, and wherein ear corn to be processed is fed into the machine from the side thereof on a level below the tops of the grate and of the reel unit, whereby an undesirable loading and piling of corn on top of the reel unit is eliminated.

A further object of this invention is to provide a feed mill machine wherein the opening between a rotatable reel unit and a perforated grate through which ear corn enters is considerably larger than the opening therebetween through which the processed ear corn is discharged, whereby the ear corn is freely movable through the entrance opening for subsequent processing.

Another object of this invention is to provide a feed mill machine having a rotating reel unit provided with radially extended finger means for assuring an even flow of the corn while it is being processed in the machine.

Yet another object of this invention is to provide a feed mill machine including the structure for attaining the above objects which is economical to manufacture, rugged, easily maintained and highly effective in use.

These and other objects will be readily apparent by reference to the following description and the accompanying drawings, wherein:

FIG. 1 is a fragmentary vertical sectional view of a feed mill machine embodying the present invention;

FIG. 2 is a sectional view taken along the line 2—2 in FIG. 1;

FIG. 3 is a perspective view of the rotating reel unit; and

FIG. 4 is an enlarged cross sectional view taken along the line 4—4 in FIG. 3.

Referring now to the drawing, the upper portion of a feed mill is shown, which machine includes a housing 10 encasing a cylinder unit, indicated generally at 11 and a rolling unit (not shown) mounted below the cylinder unit 11. Ear corn is fed along the bottom 12 of a U-shaped hopper 13 secured to an inverted U-shaped hood 14 pivotally extended over the hollow inside of the housing 10. The ear corn passes through an opening 16 formed in the side 17 of the housing 10 and between the ends 18 of the combined hopper 13 and hood 14, and is forced across the horizontally disposed lower edge 19 of the hopper defining the opening 16, and falls downwardly along a shield 21 pivotally mounted at its base 22 to the ends 23 of the housing 10.

At the base 22 of the shield 21, the corn is forced by rotation of a reel unit 24, mounted in bearing units 20 at the ends 23 of the housing, into a passage 25 formed between the reel unit 24 and a curved, perforated grate unit 26, the passage beginning at the lower pivoted end 27 of the grate unit 26. After the corn is forced along the continually narrowing passage 25 and toward the upper end 28 of the grate unit 26, the coaction between the units 24 and 26 shells the corn, crumbles the cobs, and shreds the husks. During this processing by the cylinder unit 11, the corn is forced through the grate unit 26, and then drops by gravity into the rolling unit (not shown) where the material is cracked and crimped. The finished product is then ready for discharge from the machine by any conventional method.

The reel unit 24 comprises an elongated shaft 29 rotatably mounted in the bearing units 20 for rotation about a horizontal axis. The shaft 29 at either of its exposed ends 30 is adapted to be driven from an external source. A cylindrical tube 31 is mounted about the shaft 29 between the housing ends 23 and has secured thereto a trio of flat plates 32, two of which are mounted at the ends of the tube 31 and the other of which is secured intermediate the ends. The plates 32 include diametrically opposed flanges 33 and 34 extended parallel to the axis of the shaft. Each group of common flanges 33 and 34 has adjustably mounted thereon a rotating flat bar 35, also extended parallel to the horizontal axis of the shaft. The bars 35 are radially adjustable to the shaft 29 by means of shims 37 being insertable between the bars 35 and the respective flanges 33 and 34 and retained by bolt devices 38. This arrangement provides for adjusting the spacing of the rotating bars 35 from the shaft 29. A plurality of short metal bars 39, commonly called beads, are welded to the face of each bar 35, and arranged in a herringbone pattern as best shown in FIG. 3. Formed on the tube 31 at substantially ninety degree angles to the rotating bars 35 are pairs of staggered fingers 40 and 40', the outer ends 40" of which are curved in the direction of rotation of the reel unit 24.

The grate unit 26 includes a plurality of elongated U-shaped members 41 extended longitudinally of the housing 10 and parallel to the horizontal axis of the shaft 29. The grate members 41 are laid side-by-side so that their flanges 42 extend radially in a direction substantially toward the shaft 29. In this arrangement the members 41 are welded together and form as a unit a convolute curve extended partially about the reel unit 24 and facing the opposite side 17 of the housing 10. Referring to FIG. 1, it is noted that the upper end 28 of the grate unit 26, and also the upper radial extent of the reel unit 24 indicated by the dotted circular line 43, both are above the lower edge 19 of the side opening 16 for a purpose to appear hereinafter.

To provide a radial adjustment of the grate members 41 as a unit relative to the reel unit 24, a trio of rods 44 are provided. These rods 44 are pivoted at their lower ends 46 to a shaft 47 mounted to the housing ends 23, and have portions 48 which extend complementary to the grate members 41. The rod portions 48 are secured to and form a support for the grate members 41 which they contact. At the upper ends 49 of the rods 44, they are curved for insertion through holes (not shown) formed therefor in the upper flange 51 of an angle iron 52 secured to the housing ends 23 and extended parallel to the axis of the shaft 29.

Arcuate slots (not shown) are provided in the lower flange 53 of the angle iron 52 for receiving bolt devices 54 to secure the upper grate member 41a (FIG. 1). Thus, by loosening nuts 56 provided for the rod ends 49, and by loosening the bolt devices 54, the grate unit 26 can be pivoted about the shaft 47 for radial adjustment relative to the reel unit 24, and particularly to the rotating bars 35.

The shield 21, pivotally connected at its bottom 22 adjacent the grate unit pivot 47, is adapted to assume either of the two positions indicated in FIG. 1. In the position indicated by the full lines it may readily be observed that the shield 21 acts to prevent ear corn which has entered the side opening 16 from falling through a space 57 between the shield 21 and the adjacent side 17 of the housing 10. When the shield 21 is in the position indicated by the dotted lines, however, the ear corn entering through the side opening 16 is prevented from entering the cylinder unit area and passes instead through the space 57 and down through an opening 58 formed in the housing below the grate unit 26. By providing the shield 21, it may therefore be observed that should it be unnecessary to use the cylinder unit 11, as where small grain is being processed, the grain merely by-passes the unit 11.

In use, assuming ear corn is to be processed by the cylinder unit 11, the shield 21 is placed in the full line position of FIG. 1 and the reel unit 24 is rotated in the direction indicated by the arrow. Corn (not shown) entering the side opening 16 is then directed toward the cylinder unit 11. Due to the corn being fed into the housing 10 across the inlet opening lower edge 19 and at a level below the upper extent of the reel unit 24 and of the grate unit 26, the corn does not pile on top of the reel unit 24 and is quickly drawn by the fingers 40 (FIGS. 1 and 3) into the entrance 59 of the passage 25. At this point, the rotating bars 35 (FIGS. 2 and 3) coact with the grate flanges 42 to force the corn up the continually narrowing passage 25, during which time the coaction acts to shell the corn, crumble the cobs and shred the husks, the action occurring simultaneously. As the corn is thus processed, it is then forced through holes or perforations 61 formed in the grate members 41 from where the processed corn drops due to gravity through the housing bottom opening 58 for further processing as required.

It may be seen that by virtue of the arrangement as described, the corn being processed is spread evenly across the entire length of the grate unit 26 so that no one portion or end of the grate unit is used more than another. This arrangement provides further for even wear of parts and for an even load on the shaft 29 and the bearing units 20.

To maintain the capacity of the cylinder unit 11 at the maximum, it is important that the predetermined initial clearance between the rotating bars 35 and the grate flanges 42 be maintained. Periodical adjustment must therefore be made due to wear on these parts. Here, by merely swinging back the hood 14 so as to expose the interior of the housing 10, each rotating bar 35 (FIGS. 3 and 4) can readily be removed for the insertion of shims 37 as mentioned hereinbefore. Should it be necessary, the rotating bars 35 can easily be removed from the plate flanges 33 for replacement.

Additionally, by virtue of the adjustable nature of the grate unit 26 as described hereinbefore, not only can the rotating bars 35 be adjusted relative to the grate unit 26, but also the grate unit 26 itself can be radially adjusted relative to the rotating bars 35.

Upon the discharge of fractured corn material from the upper end 28 of the grate unit 26, the discharged material strikes the lower portion 62 (FIG. 1) of a deflector 63 secured to the hood, and is deflected downwardly toward the shield 21 from whence it is again processed by continued rotation of the reel unit 24. To prevent any of the discharged material from flying outwardly through the side opening 16, a panel 64 (FIG. 1) is swingably attached at its upper end to the ends 18 of the hood 14.

Although a preferred embodiment of this invention has been disclosed herein, it is to be rememberd that various modifications may be made within the scope of the invention, as defined in the appended claims.

I claim:

1. A feed mill for shelling ear corn, crumbling the cobs and shredding the husks comprising, a hollow elongated housing having a discharge opening at the bottom and an inlet opening formed in a side thereof through which ear corn enters, rotatable means mounted within said housing for movement about a normally horizontal axis, said rotatable means including a shaft having a plurality of radially extended ear corn engaging finger elements the outer ends of which are curved toward the direction of rotation of said rotatable means, a plurality of elongated bars supported on said shaft in a spaced relation therewith, said bars extended parallel to the horizontal axis of said rotatable means, an elongated perforated grate for coaction with said bars pivotally mounted at a lower end thereof to said housing in spaced relation to said bars, the remainder of said grate above said pivotal connection curving in a convolute manner partially about said rotatable means with the upper end of said grate contiguous with said bars so as to form a passage beginning at the lower end of said grate and between said grate and said bars continually narrowing in cross sectional area toward said grate upper end, whereby ear corn drawn by said finger elements into said passage is fractured by coaction of said bars with said grate, an angle iron supported in said housing in spaced relation from said horizontal axis, means for adjustably supporting said grate including a plurality of rods pivotally connected at their lower ends to said housing and curved complementary to said grate and connected thereto, the upper ends of said rods spaced radially outwardly from said grate and inserted through openings formed therefor in said angle iron, and means threadably mounted on said upper ends for adjustably locking said upper ends to said angle iron, whereby said rods are lockable in selective positions to radially adjust said grate relative to said rotatable means.

2. A feed mill for shelling ear corn, crumbling cobs and shredding the husks comprising, a hollow elongated housing having a discharge opening at the bottom and an inlet opening formed in the side thereof through which the ear corn enters, a reel unit rotatably mounted in said housing for movement about a normally horizontal axis disposed below said side opening, said reel unit including a shaft having diametrically opposed elongated straight bars spaced radially from and extended parallel to said horizontal axis, and having further diametrically opposed ear corn engaging finger elements extended radially from said shaft at locations arcuately intermediate said bars, an elongated perforated grate, semi-circular in cross section, mounted within said housing with the concave side thereof facing said inlet opening, the lower end of said grate spaced radially from said reel unit to form a passage inlet, the remainder of said grate convolutely curved about said reel unit such that the upper end of said grate is contiguous with said reel unit, whereby ear corn drawn by said finger elements into said passage inlet is fractured by coaction of said bars with said grate, an angle iron supported in said housing parallel to said horizontal axis and to which said upper end is adjustably connected, and means for adjustably supporting said grate relative to said reel unit including a plurality of curved rods connected at their lower ends to said grate lower end and pivotally connected to said housing, the upper ends of said rods adjustably connected to said angle iron and with the intermediate portions of said rods secured to said grate for support thereof.

References Cited in the file of this patent

UNITED STATES PATENTS

| | | |
|---|---|---|
| 183,653 | Douglas et al. | Oct. 24, 1876 |
| 759,856 | Borton | May 17, 1904 |
| 963,224 | Hess | July 5, 1910 |
| 1,130,251 | Boero | Mar. 2, 1915 |
| 2,095,584 | Wilkins | Oct. 12, 1937 |
| 2,563,958 | Pollitz | Aug. 14, 1951 |
| 2,873,921 | Christiansen | Feb. 17, 1959 |

FOREIGN PATENTS

| | | |
|---|---|---|
| 19,998 | Great Britain | of 1897 |